(12) United States Patent
Wade et al.

(10) Patent No.: US 9,262,345 B2
(45) Date of Patent: *Feb. 16, 2016

(54) DATA ALLOCATION SYSTEM

(71) Applicant: Quantum Corporation, Redmond, WA (US)

(72) Inventors: Gregory L. Wade, San Jose, CA (US); J. Mitchell Haile, Somerville, MA (US)

(73) Assignee: Quantum Corporation, Redmond, WA (US)

( * ) Notice: Subject to any disclaimer, the term of this patent is extended or adjusted under 35 U.S.C. 154(b) by 382 days.

This patent is subject to a terminal disclaimer.

(21) Appl. No.: 13/716,630

(22) Filed: Dec. 17, 2012

(65) Prior Publication Data

US 2013/0117517 A1    May 9, 2013

Related U.S. Application Data

(63) Continuation of application No. 12/433,935, filed on May 1, 2009, now Pat. No. 8,176,270, which is a continuation of application No. 13/465,892, filed on May 7, 2012, now Pat. No. 8,335,898.

(51) Int. Cl.
*G06F 12/00* (2006.01)
*G06F 12/16* (2006.01)
*G06F 11/14* (2006.01)

(52) U.S. Cl.
CPC ............ *G06F 12/16* (2013.01); *G06F 11/1451* (2013.01); *G06F 11/1464* (2013.01); *G06F 11/1466* (2013.01)

(58) Field of Classification Search
CPC .................... G06F 11/1456; G06F 11/2074
USPC .................... 711/161, 162, 100, 114
See application file for complete search history.

(56) References Cited

U.S. PATENT DOCUMENTS

| | | | |
|---|---|---|---|
| 7,447,854 B1 | 11/2008 | Cannon | |
| 7,743,028 B1 | 6/2010 | Stringham et al. | |
| 8,010,495 B1 | 8/2011 | Kuznetzov et al. | |
| 8,335,898 B2 * | 12/2012 | Wade et al. | 711/161 |
| 2009/0240904 A1 | 9/2009 | Austruy et al. | |
| 2010/0125598 A1 | 5/2010 | Lango et al. | |

* cited by examiner

*Primary Examiner* — Son Dinh

(57) ABSTRACT

A data control system facilitates transfer of a virtual disk from a primary storage system to a secondary storage system. The data control system, responsive to an instruction to transfer the virtual disk, wherein the virtual disk comprises a plurality of data blocks, determines whether each of the plurality of data blocks is allocated or unallocated; for each data block of the plurality of data blocks determined to be allocated, the data control system reads the data block from memory in the primary storage system and transfers the data block for storage in the secondary storage system; and for each data block of the plurality of data blocks determined to be unallocated, the data control system refrains from reading the data block from memory in the primary storage system.

20 Claims, 5 Drawing Sheets

1

DATA ALLOCATION SYSTEM

RELATED APPLICATIONS

This patent application is a continuation of and claims priority to U.S. patent application Ser. No. 12/433,935, entitled "DATA ALLOCATION SYSTEM," filed on May 1, 2009, and claims priority to U.S. patent application Ser. No. 13/465,892, entitled "DATA ALLOCATION SYSTEM," filed on May 7, 2012, both of which are hereby incorporated by reference in their entirety.

TECHNICAL BACKGROUND

Many data backup systems require reading each block of data from a primary storage system before writing the block of data to a secondary storage system. When backing up large volumes of data, the read portion of the back up process can strain system performance and increase input/output loads on the primary storage system, which inhibits the efficient copying of data.

With the increase in popularity and acceptance of virtual computing, backing up data has become very important. However, the volumes of data requiring backup grow along with the popularity of virtual computing. In view of the drawbacks of typical backup processes, backing up data continues to be a challenge to the growth of virtual computing.

OVERVIEW

In an embodiment, a data control system facilitates transfer of a virtual disk from a primary storage system to a secondary storage system. The data control system, responsive to an instruction to transfer the virtual disk, wherein the virtual disk comprises a plurality of data blocks, determines whether each of the plurality of data blocks is allocated or unallocated; for each data block of the plurality of data blocks determined to be allocated, the data control system reads the data block from memory in the primary storage system and transfers the data block for storage in the secondary storage system; and for each data block of the plurality of data blocks determined to be unallocated, the data control system refrains from reading the data block from memory in the primary storage system.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
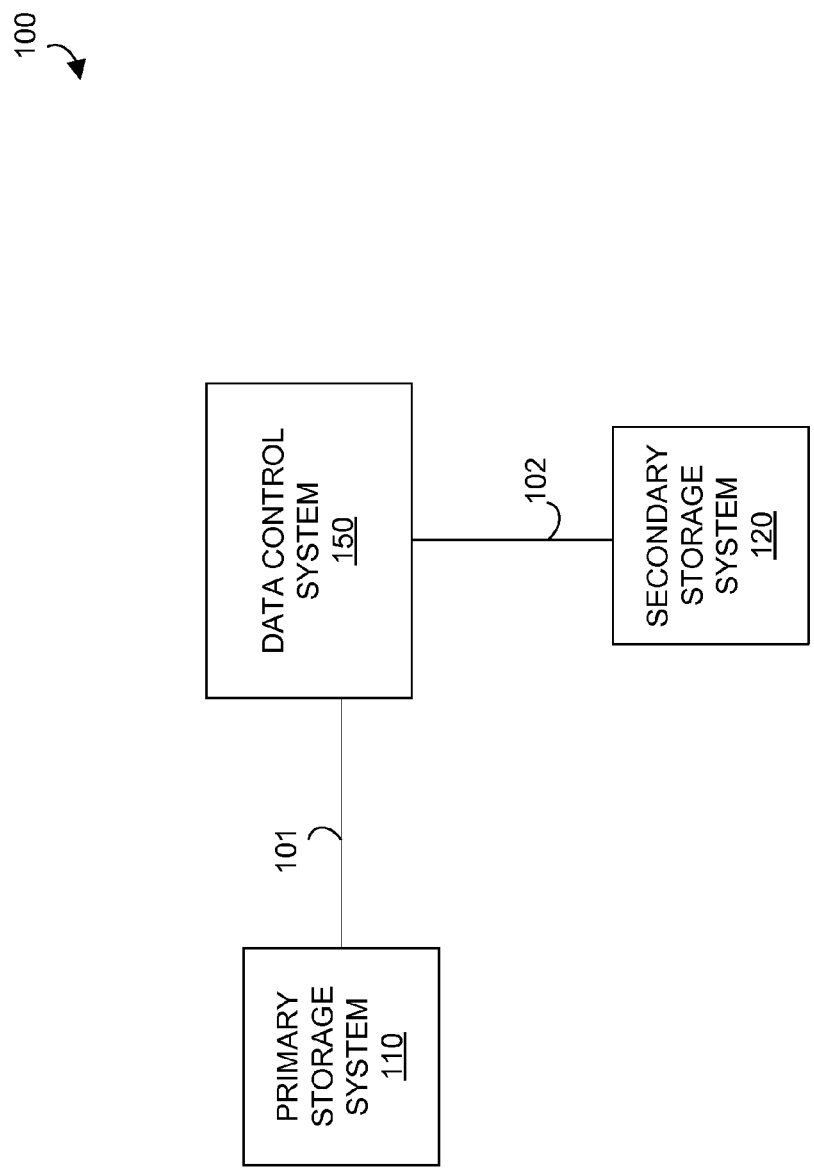
FIG. 1 illustrates a data allocation system.

FIG. 1 illustrates data allocation system 100. Data allocation system 100 includes primary storage system 110, data control system 150, and secondary storage system 120. Primary storage system 110 is in communication with data control system 150 by link 101. Secondary storage system 120 is in communication with data control system 150 over link 102.

Figure 2:
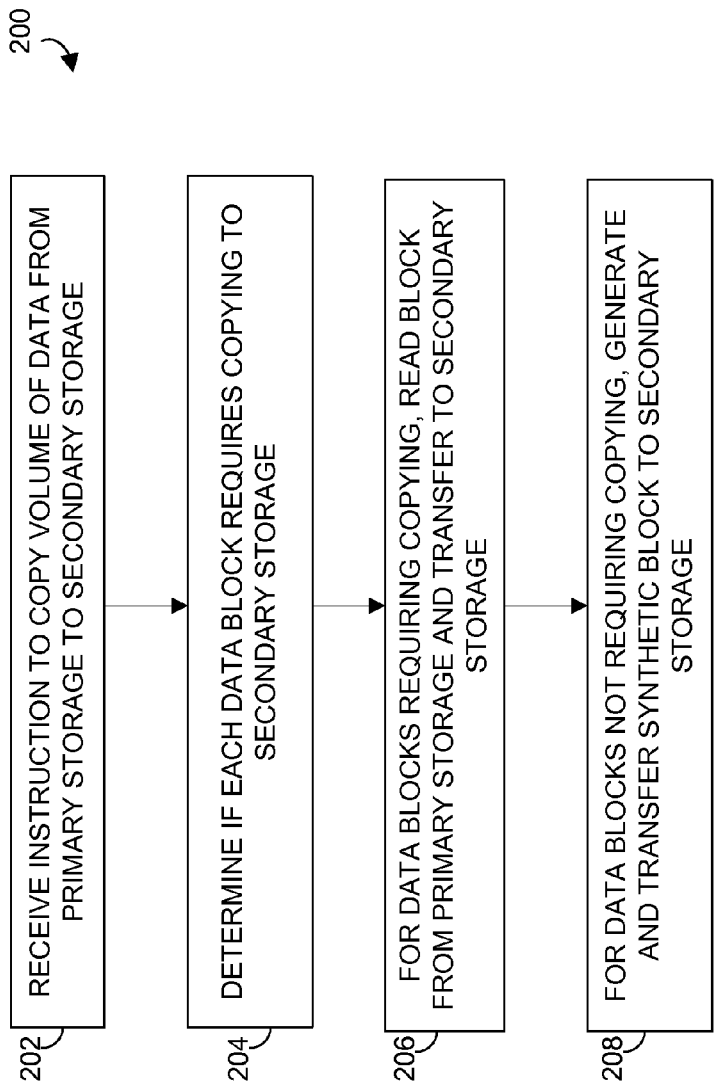
FIG. 2 illustrates the operation of a data control system.

FIG. 2 illustrates process 200 describing the operation of data control system 150. To begin, data control system 150 receives an instruction to copy a volume of data from primary storage system 110 to secondary storage system 120 (Step 202). The volume of data may comprise blocks of data.

In response to the instruction, data control system 150 determines if each block of data requires copying to secondary storage system 120 (Step 204). For blocks of data that requiring copying, data control system 150 reads each block from primary storage system 110 and transfers the block to secondary storage system 120 (Step 206). For blocks of data that do not require copying, data control system 150 generates a synthetic data block and transfers the synthetic data block to secondary storage system 120 (Step 208). Upon receiving the data blocks, secondary storage system writes the data blocks to memory.

Advantageously, process 200 provides for efficient copying of the volume of data contained in primary storage system 110 to secondary storage system 120. In particular, blocks that require copying are read from memory by data control system 150 and transferred to secondary storage system 120 to be written to memory. In contrast, blocks that do not require copying are not read from memory in primary storage system 110. Rather, data control system 150 generates synthetic data blocks and transfers the synthetic data blocks to secondary storage system 120 to be written to memory.

Referring back to FIG. 1, primary storage system 110 is any device or system capable of storing a volume of data and communicating with data control system 150. Primary storage system 110 may be, for example, a computer, a server computer, a disk array, a virtual machine running on a computer, or some other type of storage system, including any combination or variation thereof.

Likewise, secondary storage system 120 is any device or system capable of storing a volume of data and communicating with data control system 150. Primary storage system 120 may be, for example, a computer, a server computer, a disk array, a virtual machine running on a computer, or some other type of storage system, including any combination or variation thereof.

Figure 3:
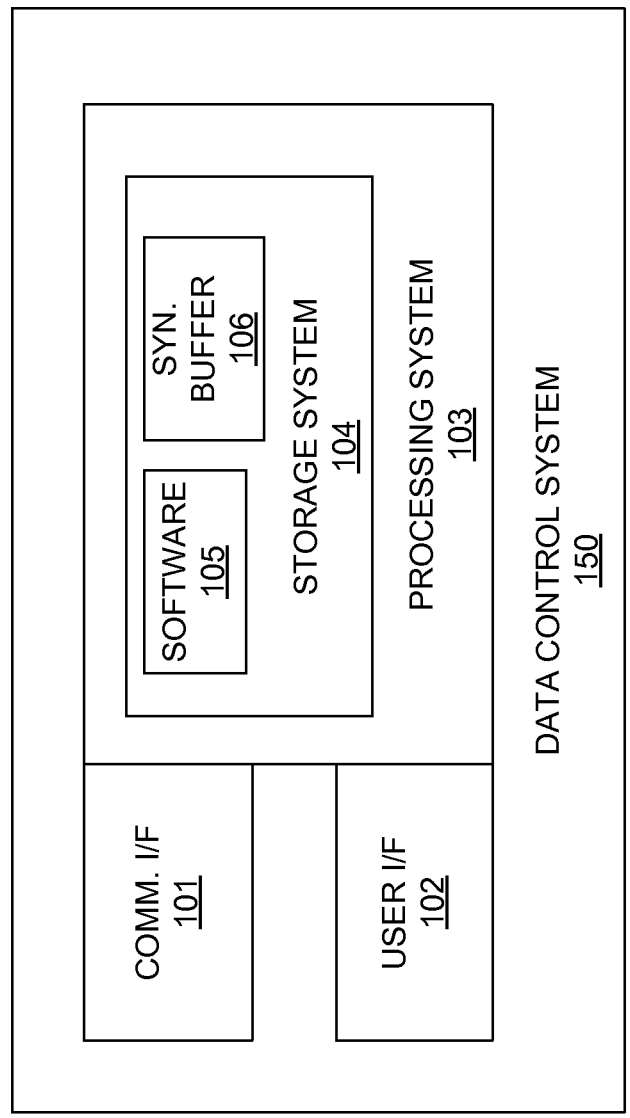
FIG. 3 illustrates a data control system.

Data control system 150 may be any device or system capable of receiving storage instructions and communicating with primary and secondary storage system 110 and 120 to copy volumes of data from primary storage system 110 to secondary storage system 120. FIG. 3 illustrates an example data control system 150.

Data control system 150 includes communication interface 101, user interface 102, processing system 103, storage system 104, software 105, and synthetic buffer 106.

Processing system 103 is linked to communication interface 101 and user interface 102. Processing system 103 includes processing circuitry and storage system 104 that stores software 105 and synthetic buffer 106. Data control system 150 may include other well-known components such as a power system and enclosure that are not shown for clarity.

Communication interface 101 comprises a network card, network interface, port, or interface circuitry that allows data control system 150 to communication with primary and secondary storage system 110 and 120. Communication interface 101 may also include a memory device, software, processing circuitry, or some other communication device.

Communication interface 101 may use various protocols, such as host bus adapters (HBA), SCSI, SATA, Fibre Channel, iSCSI, WiFi, Ethernet, TCP/IP, or the like to communicate with primary and secondary storage systems 110 and 120.

User interface 102 comprises components that interact with a user to receive user inputs and to present media and/or information. User interface 102 may include a speaker, microphone, buttons, lights, display screen, mouse, keyboard, or some other user input/output apparatus—including combinations thereof. User interface 102 may be omitted in some examples.

Processing system 103 may comprise a microprocessor and other circuitry that retrieves and executes software 105 from storage system 104. Storage system 104 comprises a disk drive, flash drive, data storage circuitry, or some other memory apparatus. Synthetic buffer 106 comprises information or data stored in storage system 104. Processing system 103 is typically mounted on a circuit board that may also hold storage system 104 and portions of communication interface 101 and user interface 102. Software 105 comprises computer programs, firmware, or some other form of machine-readable processing instructions. Software 105 may include an operating system, utilities, drivers, network interfaces, applications, or some other type of software. When executed by processing system 103, software 105 directs processing system 103 to operate data control system 150 as described herein.

In operation, processing system 103 receives a command or instruction to copy a volume of data stored on primary storage device 110. The instruction may originate from a remote computer system external to data control system 150. However, it should be understood that the command may also originate from software executed by processing system 103, such as an application or operating system process running on data control system 150.

As discussed above, the volume of data comprises blocks of data. Processing system 103 determines if each block of data requires copying to secondary storage system 120. For blocks of data that require copying, processing system 103 functions with communication interface 101 to read each block from primary storage system 110 and transfers the block to secondary storage system 120.

For blocks of data that do not require copying, processing system 103 reads a synthetic data block from synthetic buffer 106 and transfers the synthetic data block to secondary storage system 120 via communication interface 101. Upon receiving the data blocks, secondary storage system 120 writes the data blocks to memory. It should be understood that to not require copying of a block may mean that the block need not be preserved on secondary storage system 120.

Figure 4:
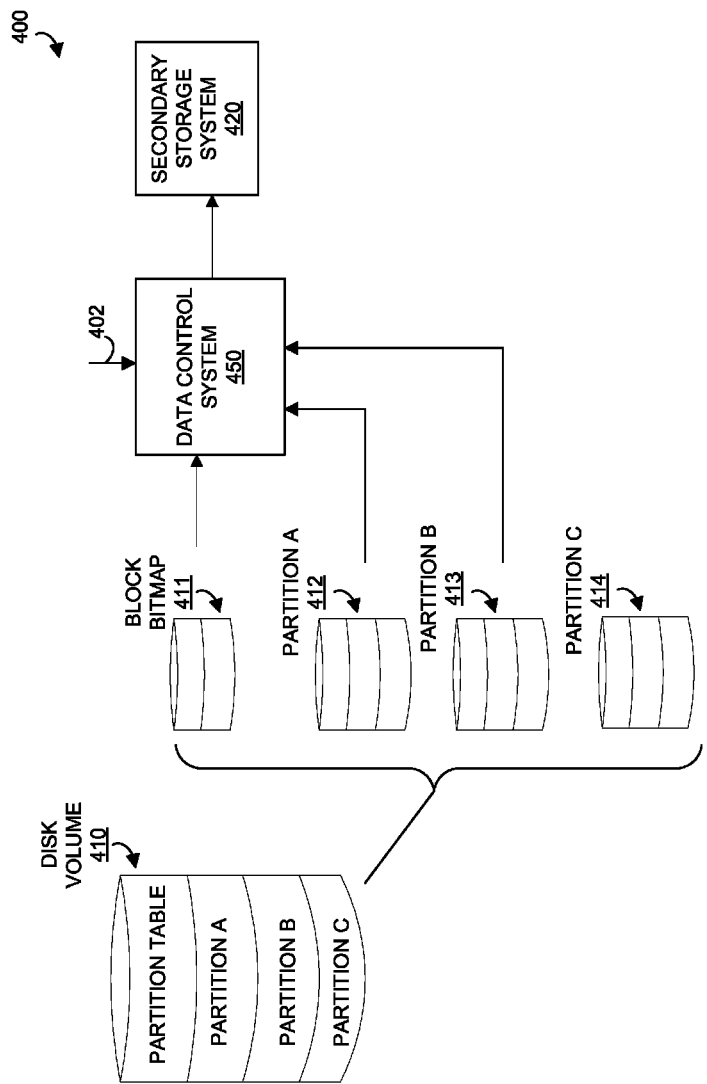
FIG. 4 illustrates a data allocation system.

FIG. 4 illustrates another example data allocation system 400. Data allocation system 400 includes disk volume 410, data control system 450, and secondary storage system 420. Disk volume 410 comprises a partition table and data partitions A 412, B 413, and C 414. In addition, disk volume 410 includes a block bitmap 411. The bitmap may be generated by a file system and can be stored within the partition of block of data being copied.

Figure 5:
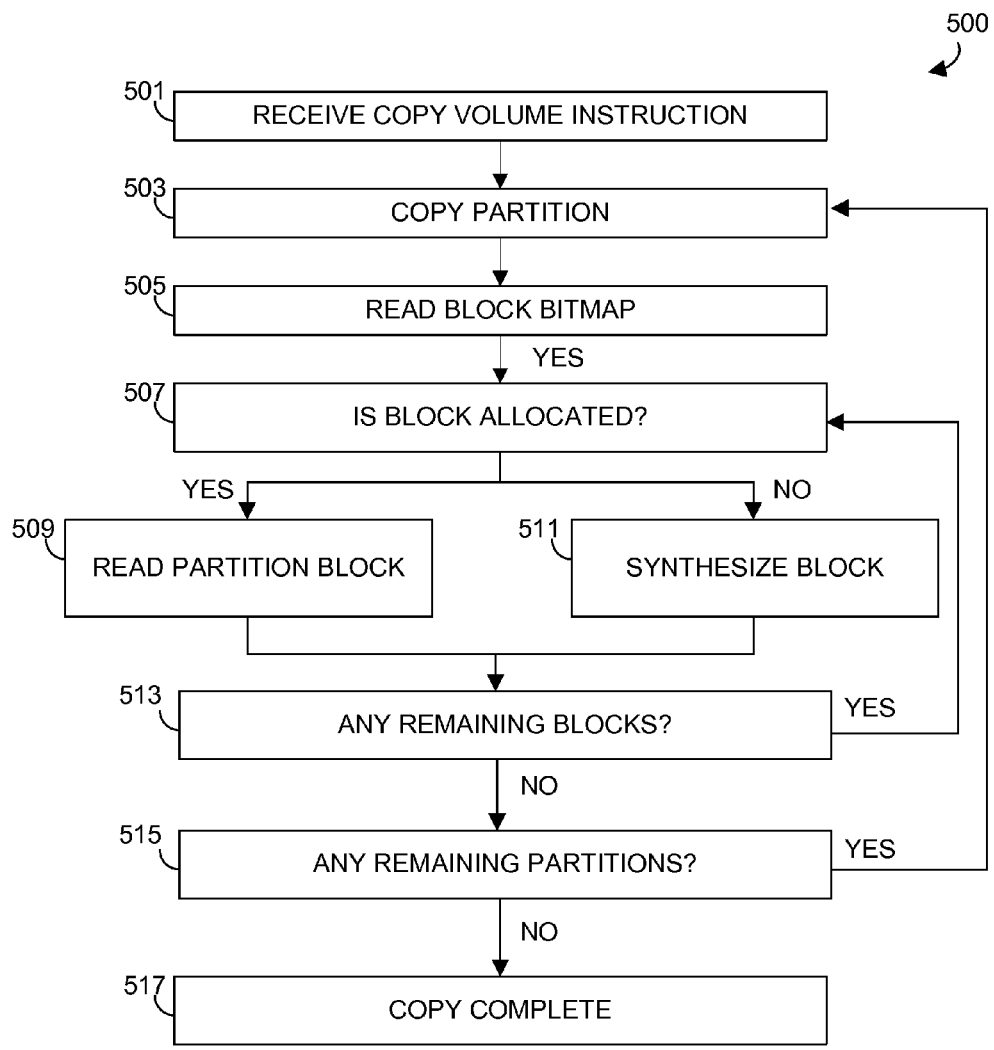
FIG. 5 illustrates the operation of a data allocation system.

FIG. 5 illustrates the operation of data allocation system 400. To begin, data control system 450 receives a copy volume instruction 402 (Step 501). Next data control system 450 proceeds to copy a first partition—e.g. partition A 412 (Step 503). As part of the copy process, data control system 450 reads and processes block bitmap 411 (Step 505) to determine if each block in partition A 412 is allocated or unallocated (Step 507). If the subject block in partition A 412 is allocated, then the block is read by data control system 450 (Step 509). If the subject block in partition A 412 is not allocated, then a new block is synthesized (Step 511). The allocated block may be transferred to secondary storage system 420. Likewise, the synthesized block may be transferred to secondary storage system 420.

After each block is processed, data control system 450 determines if any blocks remain in partition A 412 (Step 513). If some blocks remain, then process 500 continues at Step 507. Otherwise, data control system 450 determines if any partitions remain (Step 515). If so, then the remaining partitions are copied as process 500 returns to Step 503. In this manner, partitions B 413 and C 414 may be copied. If no partitions remain, then the volume copy process is complete (Step 517).

The following describes optimized block copying of any disk volume (physical or virtual) when stored on a secondary storage device that uses compression or deduplication. Process 500 creates efficient copies of disk volumes using regular patterns that are easy to compress or deduplicate. This improves subsequent write and read performance from the secondary storage device.

First, free blocks (or unallocated blocks) are identified prior to reading the unallocated blocks. This allows for copying a disk volume without having to read the contents of the free blocks. Instead, the free blocks can be synthesized by sending a buffer filled with a regular pattern to secondary storage. This is based on the insight that the content of the free blocks are irrelevant and can be replaced with a synthetic buffer having a regular pattern.

Advantageously, no disk I/O with respect to a primary storage device is required to read the free blocks. By way of comparison, there are two traditional methods for copying sets of blocks: full block copy, and incremental block copy. Both block copy methods are unaware of the allocation status of blocks and thus a read of all blocks is required. Full block copies copy all blocks. Incremental block copies optimize space utilization on secondary storage devices by finger printing blocks to determine whether to send them to secondary storage. Finger printing and other hashing or comparison methods still requires reading all of the blocks from primary storage.

In contrast, for the processes 200 and 500 described herein unallocated blocks are never read from primary storage. Rather, the allocation status of the blocks is read from the volume meta data (bitmap) and if a block is free it is replaced with a synthesized buffer. This optimizes the read of primary storage and writes on the secondary storage. This also optimizes space utilization on secondary storage devices because the synthesized buffer is highly compressible.

In a variation, client side deduplication can be utilized to avoid writing the synthesized buffer to the secondary storage device altogether. This can take the form of a network deduplication device or a secondary storage deduplication device with a client protocol. Alternatively, a protocol between the secondary storage device and the process inserting the synthesized buffer could be used to avoid sending the buffer altogether. Rather the offset, size, and contents could be communicated to the secondary storage device so as to allow the secondary storage device to replicate or reassemble the buffer. This protocol could take many forms, such as an out-of-band API, or the use of sparse files. In yet another variation, the offset, size, and contents could be embedded in the data stream.

At least one advantage of the processes 200 and 500 described herein is that less storage is required to produce a copy and the utilization of storage for allocated data is increased. Yet another benefit is the increase in the compression ratio statistics at the secondary storage device because the synthesized buffers are highly compressible. Using an incremental block copy method reduces the compression ratio statistics because the secondary storage device is unaware of the non-copied blocks and due to the behavior of most hashing methods.

Yet another advantage is reduced CPU overhead. Incremental block copy techniques require CPU overhead in order to determine which blocks to copy. By way of comparison, the processes 200 and 500 described herein require a small read of the volume meta data and almost no CPU overhead to determine whether to send the complete block or to send the synthesized buffer.

The following describes one example application of the processes 200 and 500 described herein to a live file system. In this example, a snapshot must be taken of the underlying data (virtual disk files or disk volumes). It should be understood that other methods could be employed, such as a file system freeze, checkpoint process, or the like. Then the volume meta data can be read without the possibility of a block later becoming allocated and causing an incomplete volume image to be copied. This ensures a consistent image is copied at the point in time when the snapshot was taken. The benefit is that a consistent volume copy can be made without shutting down the operating system that is using the volume.

It should be understood that the processes 200 and 500 described herein are applicable to any type of volume, such as a memory swap device, raw database volume, or file system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An apparatus for transferring a de-duplicated volume of data from a primary storage system to a secondary storage system, the data control system comprising:
one or more non-transitory computer readable media;
program instructions stored on the one or more non-transitory computer readable media that, when executed by a processing system, direct the processing system to:
responsive to an instruction to transfer the de-duplicated volume of data, wherein the de-duplicated volume of data comprises a plurality of data blocks, determine whether each of the plurality of data blocks is allocated or unallocated;
for each data block of the plurality of data blocks determined to be allocated, initiate reading the data block from memory in the primary storage system and initiate transferring the data block for storage in the secondary storage system; and
for each data block of the plurality of data blocks determined to be unallocated, refraining from initiating reading the data block from memory in the primary storage system; and
the processing system operatively coupled with the one or more non-transitory computer readable media and configured to execute the program instructions.

2. The apparatus of claim 1 wherein the program instructions further direct the processing system to, for each data block of the plurality of data blocks determined to be unallocated, initiate transferring a synthetic block for writing to the memory in the secondary storage system.

3. The apparatus of claim 2 wherein the program instructions further direct the processing system to initiate reading the synthetic block from a synthetic buffer.

4. The apparatus of claim 3 wherein the synthetic block comprises synthetic information, wherein the secondary storage system processes the synthetic information to generate synthetic data, wherein the synthetic data is written to the memory of the secondary storage system.

5. The apparatus of claim 1 further comprising storing status information indicating a status of each of the plurality of data blocks, wherein the status comprises either allocated or unallocated.

6. The apparatus of claim 5 wherein the status information comprises a block bitmap.

7. The apparatus of claim 1 wherein the de-duplicated volume of data comprises at least a portion of a virtual machine.

8. One or more non-transitory computer readable media having program instructions stored thereon for operating a data control system for facilitating transfer of a virtual disk from a primary storage system to a secondary storage system that, when executed by the data control system, direct the data control system to at least:
responsive to an instruction to transfer the virtual disk, wherein the virtual disk comprises a plurality of data blocks, determine whether each of the plurality of data blocks is allocated or unallocated;
for each data block of the plurality of data blocks determined to be allocated, read the data block from memory in the primary storage system and transfer the data block for storage in the secondary storage system; and
for each data block of the plurality of data blocks determined to be unallocated, refrain from reading the data block from memory in the primary storage system.

9. The computer readable media of claim 8 wherein the program instructions further direct the data control system to, for each data block of the plurality of data blocks determined to be unallocated, transfer a synthetic block for writing to the memory in the secondary storage system.

10. The computer readable media of claim 9 wherein the program instructions further direct the data control system to read the synthetic block from a synthetic buffer.

11. The computer readable media of claim 10 wherein the synthetic block comprises synthetic information, wherein the secondary storage system processes the synthetic information to generate synthetic data, wherein the synthetic data is written to the memory of the secondary storage system.

12. The computer readable media of claim 8 wherein the program instructions further direct the data control system to store a block bitmap indicating a status of each of the plurality of data blocks, wherein the status comprises either allocated or unallocated.

13. The computer readable media of claim 8 wherein the virtual disk comprises a de-duplicated virtual disk file containing a virtual machine.

14. A data control system for facilitating transfer of a virtual disk from a primary storage system to a secondary storage system comprising:
means for, responsive to an instruction to transfer the virtual disk, wherein the virtual disk comprises a plurality of data blocks, determining whether each of the plurality of data blocks is allocated or unallocated;
means for reading the data block from memory in the primary storage system and transfer the data block for storage in the secondary storage system for each data block of the plurality of data blocks determined to be allocated; and means for refraining from reading the data block from memory in the primary storage system for each data block of the plurality of data blocks determined to be unallocated.

15. The data control system of claim 14 further comprising means for transferring a synthetic block for writing to the memory in the secondary storage system for each data block of the plurality of data blocks determined to be unallocated.

16. The data control system of claim 15 further comprising means for reading the synthetic block from a synthetic buffer.

17. The data control system of claim 15 wherein the synthetic block comprises synthetic information, wherein the secondary storage system processes the synthetic information to generate synthetic data, wherein the synthetic data is written to the memory of the secondary storage system.

18. The data control system of claim 14 further comprising means for storing a block bitmap indicating a status of each of the plurality of data blocks, wherein the status comprises either allocated or unallocated.

19. The data control system of claim 14 wherein the virtual disk comprises a de-duplicated virtual disk file containing a virtual machine.

20. The data control system of claim 19 further comprising means for de-duplicating the virtual disk file.

* * * * *